United States Patent [19]

Ishizuka et al.

[11] Patent Number: 4,678,226
[45] Date of Patent: Jul. 7, 1987

[54] CONSTRUCTION OF VEHICLE BODY

[75] Inventors: Masashi Ishizuka; Makoto Ogawara, both of Kobe, Japan

[73] Assignee: Kawasaki Jukogyo Kabushiki Kaisha, Kobe, Japan

[21] Appl. No.: 933,274

[22] Filed: Nov. 20, 1986

Related U.S. Application Data

[63] Continuation of Ser. No. 657,539, Oct. 4, 1984, abandoned.

[51] Int. Cl.$^4$ .................. B62D 31/02; B60N 1/04; B61D 17/00
[52] U.S. Cl. .................... 296/203; 296/178; 296/29; 296/37.13; 296/64; 105/397; 105/325; 105/344; 244/118.5; 244/119
[58] Field of Search ............... 296/37.13, 64, 29, 203, 296/178; 105/396, 397, 399, 400, 401, 323, 325, 344, 345; 244/118.5, 119

[56] References Cited

U.S. PATENT DOCUMENTS

| | | | |
|---|---|---|---|
| 384,225 | 6/1888 | Zurcher | 105/399 |
| 1,509,142 | 9/1924 | Haggart, Jr. | 296/178 |
| 1,892,666 | 1/1933 | Gurney | 296/178 |
| 2,058,492 | 10/1936 | Nystrom | 105/401 |
| 2,223,746 | 12/1940 | Stoner | 105/399 |
| 2,575,454 | 11/1951 | Kuhler | 105/397 |
| 2,710,731 | 6/1955 | Bright et al. | 105/323 |

FOREIGN PATENT DOCUMENTS 460799 2/1937 United Kingdom ............... 296/178

OTHER PUBLICATIONS

The Railway Gazette, Dec. 24, 1937, pp. 1205–1208.

Primary Examiner—Robert B. Reeves
Assistant Examiner—Dennis H. Pedder

[57] ABSTRACT

A vehicle body able to withstand fluctuating external pressure while providing ample space for the passengers, by having a multiplicity of substantially square, first frames each having reinforced portions on two upper corners thereof, provided by rounding inner surfaces of the two upper corners, and a multiplicity of substantially square, second frames having reinforced portions on two lower corners thereof provided by rounding inner surfaces of the two lower corners. They are arranged alternately over the length of the vehicle body, and are connected together by longitudinal structural members. A shell plate is attached to the substantially square frames at their outer surfaces, to provide a substantially square vehicle body.

2 Claims, 4 Drawing Figures

CONSTRUCTION OF VEHICLE BODY

This application is a continuation, of application Ser. No. 657,539, filed Oct. 4, 1984, abandoned.

BACKGROUND OF THE INVENTION

This invention relates to a construction of a vehicle body of means of transportation which is subjected to external pressure tending to fluctuate.

It has hitherto been usual practice to construct a vehicle body in a manner to serve the purpose of use and suit the condition of operation. Thus, a body of a railroad car has a cross-sectional shape which is substantially rectangular, and a body of an aircraft used for transporting passengers is substantially circular in cross-sectional shape.

In the case of a vehicle body of substantially square cross-sectional shape, it is possible to secure ample space above the heads of the passengers and in the vicinity of their legs, so that good riding comfort of the passengers can be obtained. However, a vehicle body of a square shape is rather low in strength with respect to fluctuations in external pressure applied thereto. It is difficult to solve this problem without increasing the weight of the vehicle body. Meanwhile, when the vehicle body has a substantially circular cross-sectional shape, its strength with respect to fluctuations in external pressure applied thereto is high. However, this type of vehicle body suffers the disadvantage that the passengers' riding comfort is impaired by the lack of a space for the passengers to move their legs freely in sitting position and stand up without their heads knocking against some objects. Any attempt to solve this problem would entail an increase in the size of the body with an attendant rise in weight. Thus, in the case of vehicle bodies of both rectangular and circular cross-sectional shape, the solutions proposed to obviate the aforesaid disadvantages have been unsatisfactory.

SUMMARY OF THE INVENTION

This invention has been developed for the purpose of obviating the aforesaid problem of the prior art. Accordingly, the invention has as its object the provision of a construction of a vehicle body suitable for use as a vehicle body of high strength in means of transportation subjected to fluctuations in external pressure applied thereto, which is capable of achieving a high riding comfort for passengers by adopting a substantially square cross-sectional shape for securing ample space for the passengers without causing a reduction in the ability to withstand pressure.

The aforesaid object is accomplished by the feature of the invention that a multiplicity of substantially square frames each having reinforcing portions on two upper corners thereof provided by rounding inner surfaces of the two upper corners and a multiplicity of substantially square frames having reinforcing portions on two lower corners thereof provided by rounding inner surfaces of the two lower corners are alternately arranged and connected together by longitudinal structural members, and a shell plate is attached to the substantially square frames and the longitudinal structural members at their outer surfaces, to provide a substantially square vehicle body.

The advantages offered by the invention are:

(a) Although the vehicle body according to the invention is substantially square in cross-sectional shape, it is possible for the construction provided by the invention to achieve substantially as high a resistance to external pressure applied thereto as a vehicle body of a substantially circular cross-sectional shape;

(b) The construction provided by the invention enables a sufficiently large space to be provided to the passenger compartment to enable riding comfort to be improved in a manner that has hitherto been impossible for a vehicle body of a substantially circular cross-sectional shape to realize; and (c) Since the construction provided by the invention enables the cross-sectional area of the vehicle body to be minimized, a light weight can be obtained in a vehicle body.

Additional and other objects, features and advantages of the invention will become apparent from the description set forth hereinafter when considered in conjunction with the accompanying drawings.

DETAILED DESCRIPTION OF PREFERRED EMBODIMENT

Figure 1:
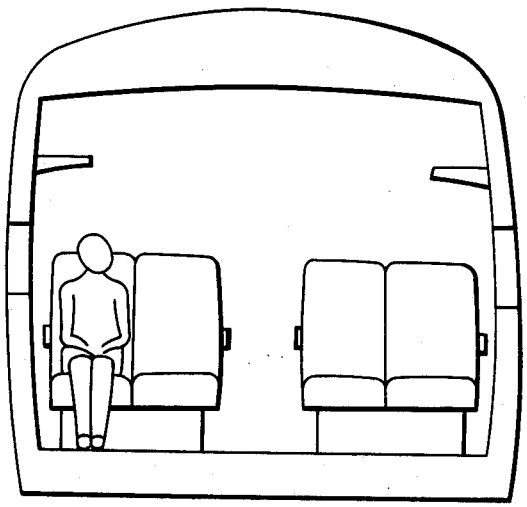
FIG. 1 is a schematic sectional view of a body of a vehicle shown as one example of a vehicle body of a substantially square cross-sectional shape used in the prior art suitable for use with railroad trains travelling at high speed.
Figure 2:
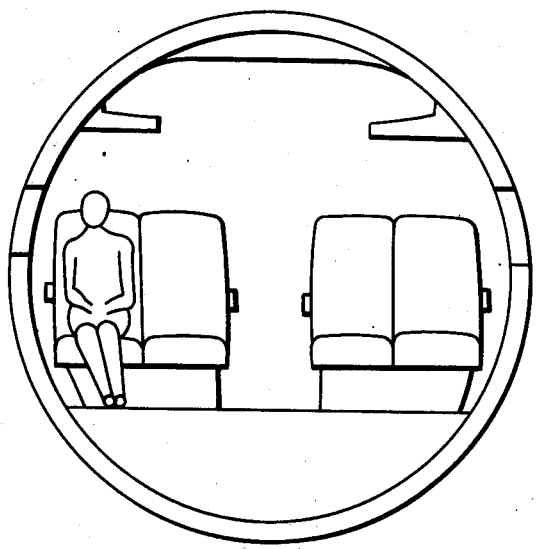
FIG. 2 is a schematic sectional view of a body of a vehicle shown as one example of a vehicle body of a substantially circular cross-sectional shape suitable for use with aircraft.
Figure 3:
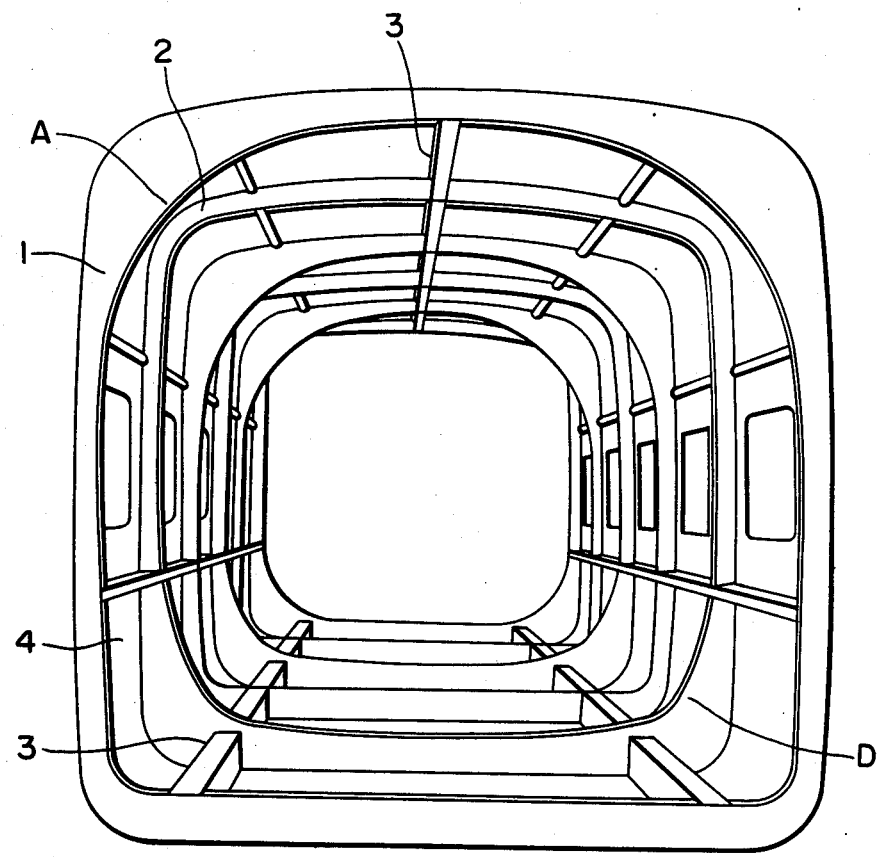
FIG. 3 is a perspective sectional view of a vehicle body comprising one embodiment of the invention.
Figure 4:
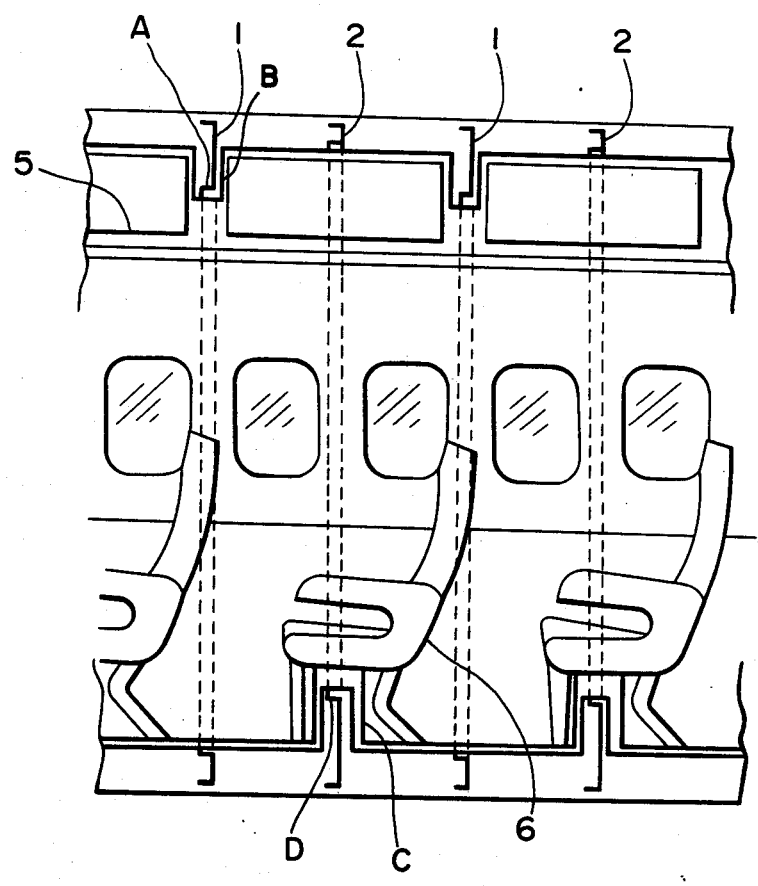
FIG. 4 is a schematic view in explanation of the arrangement of the frames in relation to facilities in the passenger compartment.

FIGS. 3 and 4 show one embodiment of a construction of a vehicle body suitable for use with means of transportation travelling at high speed, in conformity with this invention. It combines a large space desirable for achieving high riding comfort provided by the vehicle body of a substantially rectangular cross-sectional shape of railroad trains of the prior art shown in FIG. 1, with high resistance to pressure and light weight characteristics of the vehicle body of a substantially circular cross-sectional shape of aircraft shown in FIG. 2.

Referring to FIG. 3, there are shown frames 1 formed of material of light weight, such as an aluminum alloy, having a substantially rectangular cross-sectional shape and including reinforcing portions A on two upper corners provided by rounding inner surfaces of the two upper corners with a relatively large radius compared to the two lower corners, to increase the resistance of the frames 1 to changes in external pressure applied thereto. There are also shown frames 2 formed of the same material as that for forming the frames 1 and having the same cross-sectional shape as the frames 1 which include reinforcing portions D on two lower corners provided by rounding inner surfaces of the two lower corners with a relatively large radius compared to the two upper corners, to increase the resistance of the frames 2 to changes in external pressure applied thereto. A multiplicity of frames 1 and 2 are alternately arranged at a predetermined spacing interval and connected together by a plurality of longitudinal structural members 3 located at right angles to the frames 1 and 2. A shell plate 4 is attached and secured to outer surfaces of the frames 1 and 2 and the longitudinal structural members 3 to provide a vehicle body which, although its cross-sectional shape is substantially square, has substantially the same strength with respect to external pressure applied thereto as a vehicle body of a substantially circular cross-sectional shape.

In the vehicle body construction shown in FIGS. 3 and 4, the reinforcing portions A of the frames 1 and the reinforcing portions D of the frames 2 project alternately at the upper corners and the lower corners into a passenger compartment. However, as shown in FIG. 4, the upper reinforcing portions A of the frames 1 may be used for providing partition plates B at opposite ends of a baggage rack 5, and the lower reinforcing portions D of the frames 2 may be hidden under a passenger's seat 6 as indicated in a space C, for example. By this arrangement, it is possible to provide a passenger with a vacant space above his head and in the vicinity of his legs which extends over two frame spaces respectively. Thus, the space in the passenger compartment can be substantially fully utilized and substantially as high a riding comfort as achieved by a vehicle body of substantially square cross-sectional shape can be achieved.

From the foregoing description, it will be appreciated that the construction of the vehicle body provided by the invention enables an increase in the resistance to external pressure and an improvement in the riding comfort of the passengers to be achieved in a limited space by reconciling the conditions provided by the substantially square cross-sectional shape and the substantially circular cross-sectional shape with each other.

While the invention has been described as being incorporated in a vehicle body used with railroad trains of high speed of the conventional form, it is to be understood that the invention is not limited to railroad car bodies in its application, and that it can have application in various other vehicles which tend to be subjected to fluctuations in external pressure applied thereto, such as magnetic or air-cushion suspention-type lenear motor driven vehicles of superhigh speed, aircraft, submarine, etc.

What is claimed is:

1. An elongated vehicle body of substantially square cross-sectional shape comprising: a plurality of transverse frames; a plurality of longitudinal structural members located at right angles to said frames to connect said transverse frames together; and a shell attached and secured to outer surfaces of said frames and of said longitudinal structural members, said plurality of frames comprising a plurality of substantially square first and second frames, each first frame having relatively large radius inwardly projecting portions for reinforcing each first frame at two upper corners thereof and a relatively small radius at each of two lower corners thereof, each second frame positioned between adjoining first frames and having relatively large radius inwardly projecting portions for reinforcing each second frame at two lower corners thereof and a relatively small radius at each of two upper corners thereof, said upper corner small radii being such located respectively vertically above a passenger seat, and said lower corner small radii being each located respectively between adjoining passenger seats to provide increased space for the accommodation of passengers.

2. A vehicle body as claim 1, comprising a plurality of baggage racks respectively arranged between adjacent said inwardly projecting portions at upper corners of said first frames, and a plurality of said seats, each respectively straddling one of said inwardly projecting portions at lower corners of said second frames.

* * * * *